Sept. 14, 1926.
J. S. LANG
SHOCK ABSORBER
Filed Sept. 25, 1925
1,599,902
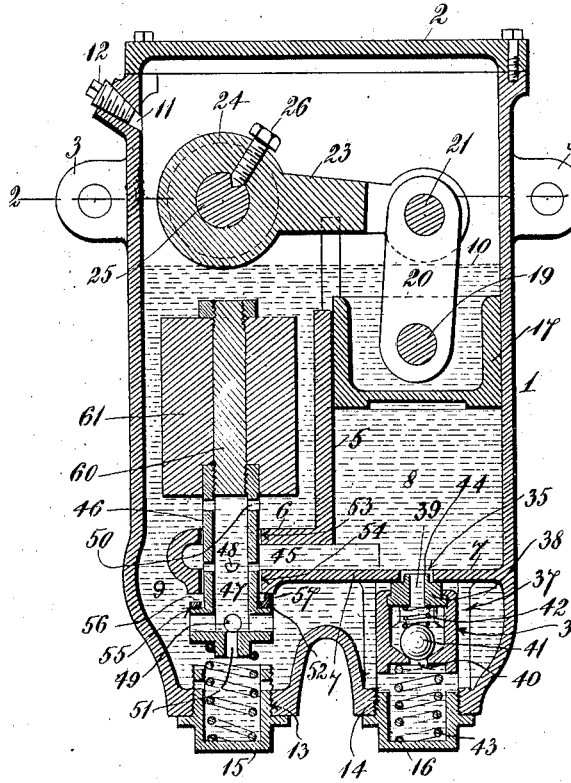
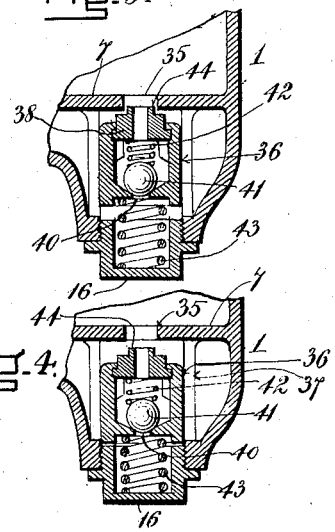
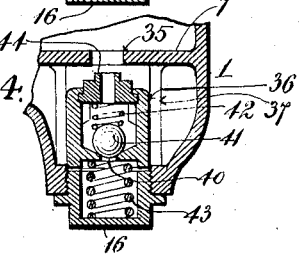
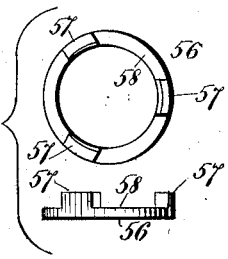
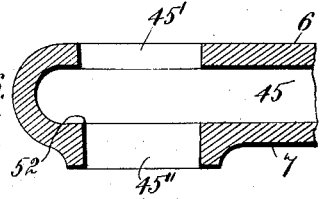
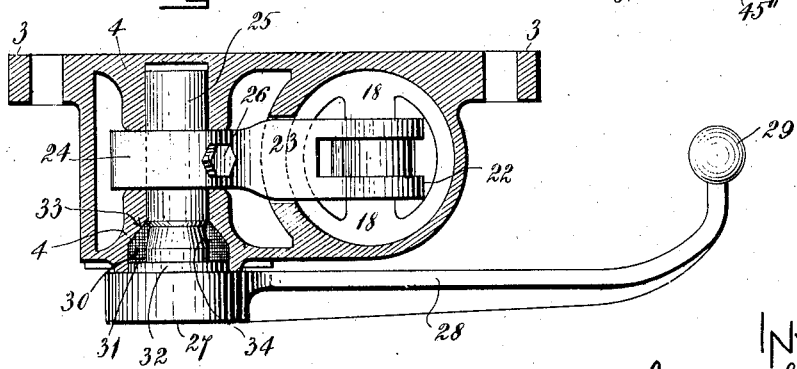

Patented Sept. 14, 1926.

1,599,902

UNITED STATES PATENT OFFICE.

JAMES S. LANG, OF BOSTON, MASSACHUSETTS.

SHOCK ABSORBER.

Application filed September 25, 1925. Serial No. 58,656.

The present invention relates to that class of shock absorbers which are especially adapted for motor vehicles, and in which the force required to pass a fluid through a constricted opening is utilized to prevent excessive vibration or rebound.

The object of the invention is to provide a generally improved shock absorber having extreme sensitiveness, of relatively few and accessible parts and of such design as to eliminate the necessity of extreme accuracy in the manufacture of its parts. It is also my object to provide a shock absorber which will remain free from leakage of its contained fluid throughout a long continued period of wear and having a gradation of relief valve areas at extreme pressures.

The invention can best be seen and understood by reference to the drawings in which an absorber embodying the invention is shown, and in which—

Figure 1 is a medial vertical cross section.

Fig. 2 is a horizontal section on line 2—2 of Fig. 1.
Fig. 3 is a medial vertical cross section of a combination inlet and relief valve in a partially opened position, also shown in a fully closed position in Fig. 1.

Fig. 4 is a medial vertical cross section of the valve shown in Fig. 3 but in an open position.

Fig. 5 shows a castellated stop ring shown also in section in Fig. 1.

Fig. 6 is a vertical section of a detail of construction to which special reference will later be made.

Referring to the drawings:—

1 represents a casing with a removable cover 2. Projecting laterally from the casing are lugs or ears 3 by which it may be secured to the body or framework of a vehicle. On the inside the casing is provided with spaced bearings 4 for a rock shaft later to be referred to. The interior of this casing is also provided with various members or partitions 5, 6 and 7, respectively, which provide within it a compression chamber 8, and outside this chamber immediately adjacent thereto a secondary or expansion chamber 9 with openings between the two chambers, certain of the partitions assisting in the valvular control of said openings.

The casing forms a receptacle for oil or other suitable fluid contained within its respective chambers, and maintained within the casing at about the level indicated at 10. The oil or other fluid is introduced into the casing at the top by way of the inlet 11, closed by the filling plug 12. At the bottom the casing is provided with outlet openings 13 and 14, closed by plugs 15 and 16. These openings provide outlets for the oil and also openings through which the parts above may be machined and through which certain of the working parts may be introduced into the casing.

The compression chamber 8 is within a cylinder formed by the co-operation of the wall or partition 5 with the walls of the casing. Contained to reciprocate within the cylinder is a piston 17. The piston is provided with interior cheeks 18 within which a pin 19 is fixed, to cross the space between the cheeks. Pivotally secured to the pin is a link 20, which is also pivotally secured to a pin 21 fixed in the spaced ends 22 of a rocker arm 23.

The rocker arm 23 is provided with a hub 24 secured to a rock shaft 25 which turns within the spaced bearings 4 in the casing above referred to. The hub 24 is held in relation to the shaft 25 by any suitable means, as for example the set screw 26.

Either keyed upon the outer end of the shaft 25 or constructed integrally therewith is a hub 27 carrying an external rocker arm 28 provided with a ball 29 for making a ball and socket connection with any suitable means (not shown) for connecting it to the axle of a vehicle.

With this arrangement of parts it will be seen that any change in the relative positions of the axle and the vehicle frame or body due to irregularities in the roadway will act to move the piston 17, which is raised or lowered in the cylinder as the case may be.

To prevent the oil or other fluid from leaking along the shaft 25 and escaping, the side of the casing is provided with a packing gland 30, filled with a suitable packing 31. A packing retaining ring 32 encircles the shaft 25, holds the packing firmly in place in the gland and is itself held by the pressure exerted upon it by the hub 29. The inner portion of the gland 30 is extended in the shape of a hollow cone 33 with its axis coinciding with the axis of the shaft 25. Opposite the conical section 33 of the packing cavity the surface of the shaft 25 is provided with a conical section 34 having a less inclination to the axis of the shaft than the inclination of the surface 33. The surfaces 33 and 34 thus form a cavity of which both the cross section and circumference decrease as its back end is approached. Thus it is seen that when the packing material, preferably cork rings, is pressed into the end of the cavity by the ring 32 it is subjected not only to the longitudinal pressure exerted by the ring but to a radial pressure due to the wedging action of the inclined walls of the cavity, and also to a circumferential pressure due to the decrease in the circumference of the cavity at its inner end, thus reducing the possibility of leakage to a minimum.

Referring now to the means for controlling the passage of oil between the pressure chamber 8 and the secondary or expansion chamber 9. The wall or partition 7 in the casing extends beneath the cylinder containing the pressure chamber and forms the bottom wall of this chamber. Within the partition 7 forming a valve seat at the lower end of the cylinder is located an opening or port 35. This port is between the compression chamber and the secondary chamber which as shown in Fig. 1 extends beneath the compression chamber.

The port 35 is controlled by the combination inlet and discharge valve which permits of a relatively free flow of oil from the secondary chamber into the cylinder when the piston is raised, and permits a discharge of oil from the compression chamber to the secondary chamber under a heavy pressure only. 36 is the shell or body of this valve which is guided in its movement with reference to the port 35 by guiding fins 37. Beaded or otherwise suitably fastened into the upper end of the valve shell 36 is a valve disk 38 having through its centre a port 39. Through the lower end of the valve shell 36 is a port 40 normally closed by the valve ball 41 by reason of the pressure exerted by the light spring 42 inserted between the ball 41 and the valve disk 38. The lower end of the valve shell 36 is adapted to receive the upper end of a heavy spring 43, the lower end of which is supported by the closing plug 16. Thus arranged, the spring 43 holds the valve disk 38 firmly in contact with the lower side of the partition 7, closing the port 35 as shown in Fig. 1.

In operation, when the pressure of the fluid in the pressure chamber 8 is less than that in chamber 9 due to the rise of the piston in the cylinder, the excess of pressure in chamber 9 will raise the valve ball 41 compressing the light spring 42 and thus allow the fluid to pass with relatively small resistance from chamber 9 to the pressure chamber 8. When, however, the piston descends in the cylinder the ball 41 tightly closes the passage 40 and, provided another valve subsequently to be mentioned is closed, the fluid can escape from the pressure chamber only at heavy pressure by the depression of the valve disk 38 which is opposed by the pressure of the heavy spring 43 as shown in Fig. 3. In order to provide a more or less constant valve opening over an appreciable range of pressure, the upper surface of the valve disk 38 is extended into the port or opening 35 by a tubular lip or projection 44 having a diameter somewhat less than the diameter of the port or opening into which it extends. It is thus seen that as the valve is opened by the pressure in the compression chamber 8 the fluid begins to escape as soon as the disk 38 leaves contact with the under side of partition 7 and the valve opening increases with the continued depression of the valve until the cylindrical area disclosed between the upper surface of the disk 38 and the lower edge of the port 35 becomes equal to the annular area between the lip 44 and the inner wall surface of port 35, after which further depression of the valve will not result in increased valve opening until the tubular lip 44 has been fully withdrawn from the port 35, which will then be fully opened by the complete depression of the valve at a heavy pressure as shown in Fig. 4.

The partitions 6 and 7 co-operate with one another to form an extension passage 45 from the lower end of the compression chamber. These partitions are bored to provide an outlet from the compression chamber by way of the openings 45' and 45" oppositely arranged and which receive with a freesliding fit a cylindrical valve 46, the bore of partitions 6 and 7 around the openings 45' and 45" forming a valve seating.

In its preferred form as shown in Fig. 1, the valve 46 is provided with a hollow cylindrical space 47 forming a passageway for the transference of fluid from the compression space to the secondary chamber and vice versa. Ports 48, 49 and if desired ports 50 are bored through the cylindrical walls of the valve and a port 51 is bored axially through its lower end. By means of these ports the passage of the fluid through the valve is controlled as movement of the valve takes place. In order that the valve may be free from friction and in perfect balance, the ports 48, 49 and 50 are spaced equally around the circumference of the valve. In its normal position as shown in Fig. 1 there is free communication between the compression space 8 and the secondary chamber 9 by way of the open ports 48, the interior space 47 and the ports 49, 50 and 51. When the fluid passes from the compression space 8 to the secondary chamber 9 entering the valve through ports 48, its path may, in case ports 50 are used, divide in the valve space 47, one portion passing upward and out by way of ports 50 and a larger portion passing downward and out through the ports 49 and 51. The edge 52 of the valve seating at the upper surface of partition 7 forms a working edge in connection with the ports 48, closing the latter when the valve is depressed and opening them when the valve is raised. In order that the closure of the valve may take place with a minimum movement of the valve or, in other words, may be as sharp as possible, the upper edges of the ports 48 are preferably rectilinear and parallel to the upper surface of partition 7.

The valve 46 is of such size that it can move vertically with perfect freedom within the openings 45' and 45" in partitions 6 and 7, and is so fitted that pressure exerted upon the fluid in chamber 8 will result in a limited upward flow of fluid through partition 6 alongside and around the outside wall of the valve 46 and also a limited downward flow of fluid through partition 7 alongside and around the outside wall of the valve. Such flow of the fluid will take place in the form of very thin annular sheets or jets through jet passages 53 and 54, respectively.

Directly above ports 49 the diameter of the valve is enlarged by a circular shoulder or edge 55 upon which rests a castellated stop ring 56 and, as the shoulder 55 and its superposed stop ring 56 lie directly in the path of the discharge through jet passage 54 in partition 7, they will be acted upon by the force of such discharge. The stop ring is provided with raised spaced striking facets 57 which contact with the lower side of partition 7 forming a stop limiting the upward movement of the valve. In order to provide a free path for the escape of the fluid entering by way of jet passage 54, the stop ring is made thinner at points 58 between the facets 57 than the thickness through the facets.

Into the upper end of the valve 45 is threaded a spindle 60 which carries a weight 61. The upward flow of the fluid through partition 6 by way of jet passage 53 will impinge upon the lower end of the weight 61 forming a shoulder to the valve, the effect of such flow varying as the distance between the weight and partition 6 is varied.

It is therefore seen that the upwardly flowing annular jet through jet passage 53 in partition 6 tends to raise the valve 46, and the downwardly flowing jet through jet passage 54 in partition 7 tends to depress it.

As seen in Fig. 1 the stop ring 56 while in the normal position is in contact with or close proximity to the lower side of partition 7 and therefore with the shoulder 55 receives the full influence of the downwardly moving jet through jet passage 54 in partition 7. As the valve is moved downward the shoulder and ring move farther away from partition 7 and the influence of the downwardly flowing jet becomes rapidly less, while the weight 61 approaches the upwardly flowing jet through jet passage 53 which has an increased effect.

As in the normal position shown the initial effect of the downwardly flowing jet through jet passage 54 considerably exceeds the effect of the upwardly flowing jet through jet passage 53, the effect of the latter may be increased by making the opening 45' slightly larger than 45" both of which are as shown in Fig. 6 preferably bored on a very slight continuous taper, thus neutralizing in part the effect of the close proximity of the shoulder 55 and stop ring 56 to the partition 7.

The forces acting upon the valve 46 are not only those due to upwardly and downwardly flowing jets through jet passages 53 and 54 around the outside of the valve, acting whenever the pressure in the pressure chamber 8 exceeds that in the supplementary chamber 9, but also reactive forces due to the flow of fluid through the valve, acting only when the ports 48 are open.

Referring now to the reactive forces due to the flow of fluid through the valve: If port 51 is arranged axially as shown in Fig. 1, there is a still further tendency of the valve to rise due to the excess of effective area at the upper end of the valve over the effective area at the lower end of the valve.

It is therefore seen that the reactive forces tending to open the valve due to the passage of the fluid through the valve are used to neutralize in part the excess of force tending to close the valve exerted by the downwardly moving jet through jet passage 54 outside the valve due to the close proximity of the shoulder 55 and stop ring 56 to partition 7.

The lower end of the valve 46 is adapted to receive the end of a supporting spring 62 the lower end of which is retained in a suitable socket in the closing plug 15. This spring is a light spring or, in other words, a spring capable of holding the weighted valve in an open position and a spring also possessing such tension only as will enable it to hold the valve open in a state of substantial balance with its stop ring 56 bearing lightly against the under side of the partition 7 acting as a stop, when the valve is being subjected to forces exerted by the moving fluid passing by or through it as explained above, when the valve will be free to move in a vertical direction in response to certain forces as may be brought to bear upon it.

A stop limiting the downward movement of the valve is provided by its lower end coming into contact with the upper edge of the spring-containing cap 15 when the valve is in its extreme lower position, in which position ports 48 are fully closed except for such flow as may be due to the clearance between the body of the valve and the hole through partition 7.

Reference will now be made to the effect of the piston 17 upon the valve 46: It will be assumed that the valve held open by its supporting spring 62 has taken a position with its stop ring 56 bearing with a light pressure against the under side of partition 7, in which position all its ports are open. It will now be assumed that the piston 17 is moved downward in the chamber 8, resulting in an excess of pressure in compression chamber 8 over that in the auxiliary chamber 9. This will cause a flow of fluid to take place through the opening in partition 7 alongside the outer wall of the valve 46 in the form of an annular jet which will impinge upon the stop ring 56 and the shoulder 52 and by its pressure or impact would, if not neutralized by other forces, depress the valve and overcome the tension of the spring, closing the valve. At the same time, however, an upward flow of fluid takes place through partition 6 alongside the outer wall of the valve 46 which impinges upon the lower end of the weight 61 tending to raise it and the valve 46 attached to it. As the opening 45' is slightly larger than 45'' a greater flow will take place through partition 6 than through partition 7 compensating in part for the greater distance through which the upper jet must travel before impact, thus lessening the effect of the downwardly flowing jet through partition 7. A flow will also take place through ports 48 into the interior space 47 of the valve and outward through the ports 49, 50 and 51, which results as previously explained in a reactive force tending to raise the valve and still further oppose or neutralize the excessive force exerted by the downwardly flowing jet through the opening in partition 7. The amount of this reactive force is increased by increase in size of ports 49 and 51 or decrease of port 50 or both or vice versa.

It will thus be seen that the force of the downward flow of fluid alongside the exterior wall of the valve lessened by the force of a larger upward flow of fluid and lessened by the reaction of the flow of fluid taking place through the interior of the valve will become so neutralized as to exert no disturbing influence upon the valve tending to close it in the event that the valve is maintained in a state of substantial balance by its supporting spring, or, in case the tension of the spring be excessive, it will (by proper proportioning of the passages) tend to neutralize the normal pressure with which the supporting spring is holding the valve against its stop. The preferred valve adjustment is such that the stop ring 56 bears with a very light pressure against the partition 7 and the force of the downwardly flowing jet is so neutralized that it approximates the stop ring pressure. It is clear, however, that both adjustments and neutralization are not critical and that the device is operative even should the downwardly flowing jet be overneutralized so that a lifting effect upon the valve would be obtained, though in that case its efficiency and sensitiveness would be decreased.

Having described the effect upon the valve of liquid flow due to pressure brought about by movement of the piston 17, reference will now be made to the function of the valve 46 and its attached weight 61 without reference to the flow of liquid already described. The valve and its attached weight may be considered as one with reference to the effects of their inertia. Assuming the weighted valve supported by the spring 62, to be in substantially static balance resting lightly against its upper stop as shown in Fig. 1: If depressed from this position and state the spring 62 will be compressed and upon release will return the valve to its original position as the inertia of the weight and valve is overcome by the spring. If now the absorber casing 1 carrying the partitions 6 and 7 together with the spring-supporting plug 15 be suddenly raised, the inertia of the weight due to its considerable mass will tend to cause it and its attached valve to lag behind the rise of the casing, compressing the spring 62 and resulting in a relative movement between the casing and its valve. This relative movement if sufficiently great will close the ports 48. If the upward movement of the casing is not accelerating continued, the compressed spring 62 will in turn overcome the inertia of the weight and valve which, overtaking the casing, will regain its original position, reopening the ports 48.

The operation of the absorber is as follows: It will be assumed that all the parts of the shock absorber are in normal position, with ports 48 open, the piston occupying a position about midway of the cylinder, and that the vehicle with its axle in normal relation of the body encounters a raised obstruction in the roadway having an abrupt rise succeeded by a corresponding decline and of sufficient height and width under ordinary circumstances to produce a violent rebound. The vehicle and shock absorber with it reach the obstruction with all parts in substantially normal positions, and as the wheels mount the rise the axle is brought nearer to the body of the vehicle compressing the vehicle springs. Simultaneously with the rise of the axle the hub 24 is turned lifting the rocker arm 23 which raises the piston in the cylinder, and oil is drawn into the compression chamber below the piston from the secondary chamber by way of the valve 36 when the ball 41 is raised permitting a relatively free passage through the port 39, and by way of the ports 48 in valve 46 and along the annular jet passageway surrounding the body of the valve 46. If as assumed above the approach is quite abrupt, followed by an immediate decline, the inertia of the vehicle body will prevent an appreciable rise of the vehicle body until the wheels have reached the top of the obstruction, when an incipient rebound will begin. The vehicle body then rises slightly from its line of travel and simultaneously the axle begins to move away from the body as the wheels pass the horizontal crown, moving the piston downward in the cylinder and discharging fluid through the ports 48 and through the annular clearance between the body of the valve and the openings in partitions 6 and 7. As heretofore explained, the discharge of the fluid through partition 7, partially neutralized by the discharge through partition 6 and partially neutralized by the reaction of the fluid flowing through the valve, tends to depress the valve. On this tendency of the valve to close due to the downwardly flowing jet, there is superposed a force also tending to close it due to the inertia of the weight 61 in conjunction with the slight rise of the vehicle body in passing the obstruction. The effect of the two forces mentioned will quickly and completely close the valve ports 48 preventing any substantial flow of oil through the valve. As the wheels pass over the crown of the rise, therefore, the vehicle springs will be held in a state of compression and the rebound prevented, as the oil can only slowly escape from the compression chamber through the clearance surrounding the valve 46. In order that the pressure within the compression space 8 may not become so great as to endanger either structure of the absorber or its attachments to the vehicle, it is not allowed to exceed a determinate amount through the action of the valve 36, which is opened as shown in Fig. 4 by such excessive pressure. As the wheels descend on the further side of the obstruction the weighted valve tends to regain its first position and the ports 48 are again opened as the level roadway is reached.

A case the opposite of the preceding will now be considered, in which the vehicle passes a wide and deep depression in the roadway: Due to the inertia of the vehicle body, when the wheels go into the depression the axle moves down and away from the vehicle body. As this movement takes place the piston moves downward in the cylinder, the fluid passing out through ports 48 and through the annular clearances surrounding the valve 46. The depressive action of the jet through the partition 7 is, however, in this case opposed by the inertia of the weight 61 due to the slight fall of the vehicle body, with the result that the ports 48 remain wide open. This allows the vehicle springs to freely expand and thus support the vehicle body well up in its normal position and as the wheels strike the rise on the opposite side of the hollow the piston regains its normal position. The operation in passing the top of the incline onto the level roadway resembles somewhat that in passing the raised obstruction previously described.

Having thus fully described my invention, I claim and desire to secure by Letters Patent of the United States:—

1. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, and a stop, a piston attachable to the other of said parts and reciprocable in said pressure chamber, a weighted valve for controlling said outlet, tension means for holding said valve in a normal open position against said stop with an appreciable pressure, and means whereby the pressure of the fluid when compressed by the piston will change the pressure with which the valve is pressed against said stop.

2. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, and a stop, a piston attachable to the other of said parts and reciprocable in said pressure chamber, a weighted valve for controlling said outlet, tension means for yieldingly holding said valve in a normal open position against said stop with an appreciable pressure, and means whereby the pressure of the fluid when compressed by the piston will lessen the pressure of the valve against said stop without disturbing the normal open position of the valve.

3. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, and a stop, a piston attachable to the other of said parts and reciprocable in said pressure chamber, a weighted valve for controlling said outlet, tension means for yieldingly holding said valve in a normal open position against said stop with an appreciable pressure, and means whereby the pressure of the fluid when compressed by the piston will neutralize the effect of the pressure of said tension means whereby the valve will be supported in substantial balance.

4. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, and a stop, a weighted valve for controlling said outlet, and tension means for yieldingly holding said valve in a normal open position against said stop with an appreciable pressure, said valve being adapted and arranged whereby the pressure of the fluid when compressed by the piston will be directed to act upon the valve and change the pressure with which the valve is pressed against said stop.

5. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, and a stop, a weighted valve for controlling said outlet, and tension means for holding said valve in a normal open position against said stop with an appreciable pressure, said valve being adapted and arranged whereby the pressure of the fluid when compressed by the piston will be directed to act upon the valve and lessen the pressure of the valve against said stop without disturbing the normal open position of the valve.

6. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, and a stop, a weighted valve for controlling said outlet, and tension means for yieldingly holding said valve in a normal open position against said stop with an appreciable pressure, said valve being adapted and arranged whereby the pressure of the fluid when compressed by the piston will be directed to act upon the valve and neutralize the effect of the pressure of said tension means whereby the valve will be supported in substantial balance.

7. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet and a valve mounting through which said outlet extends, a weighted valve for controlling said outlet with extension therethrough and through said mounting and with edge-forming portions above and below said mounting respectively, and tension means for yieldingly holding said valve in a normal open position against said mounting with an appreciable pressure, said mounting acting as a stop, said valve being adapted and arranged whereby the pressure of the fluid when compressed by the piston will be directed to act upon said valve with jet action in one direction sufficient to overcome the effect of the pressure on the valve exerted by said tension means and with jet action in another direction sufficient to neutralize the effect of the first jet action whereby the valve will be held in a normal open position engaging its stop in a state of substantial balance.

8. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet and a valve mounting through which said outlet extends, a weighted valve for controlling said outlet with extension therethrough and through said mounting and with edge-forming portions above and below said mounting respectively, a castellated ring arranged upon said under edge portion of the valve and interposed between it and said mounting acting as a stop, and tension means for yieldingly holding said valve in a normal open position and whereby also the valve and ring carried thereby will bear against said mounting acting as a stop as aforesaid with appreciable pressure, said valve being adapted and arranged whereby the fluid when compressed by the piston will be directed to pass both inside and outside the valve in different directions with the result of neutralizing the effect of the pressure exerted by said tension means so that the valve will be held open engaging its stop in a state of substantial balance.

9. In a fluid check shock absorber for controlling the movement of relatively movable parts comprising an element attachable to one of said parts and having a pressure chamber provided with a port, a piston attachable to the other of said parts and reciprocable in said pressure chamber, an inwardly closing valve having a valve seating outside said chamber for controlling said port, said valve being provided with a projection extending inside said port when said valve is occupying a closed position, said extension having a less diameter than the diameter of said port, and tension means for holding said valve in a normal closed position.

10. In a fluid check shock absorber for controlling the movement of relatively movable parts, the combination comprising an element attachable to one of said parts having a pressure chamber, said element being provided also with a port permitting of the circulation of a contained fluid into and out of said chamber, a piston attachable to the other of said parts and reciprocable in said pressure chamber, separate valves controlling the opening through said port against the passage of fluid movable therethrough in reverse directions one an inwardly closing valve having a seating exterior of said port with a projection extending inside the port when said valve is occupying a closed position, said projection having a less diameter than the diameter of said port, said inwardly closing valve having also a passage through it in communication with said chamber and with an exterior valve seat through which said passage extends, an outwardly closing valve controlling said passage, and tension means for holding said inwardly closing valve in a normal closed position.

11. In a fluid check shock absorber, a fluid-containing casing and a shaft journaled to turn on said casing and extending through an opening in the side of the casing, said casing adjacent said opening having a packing gland extending alongside and around said shaft provided with a conical inner end section having an acute angular inclination to the axis of said shaft, said shaft in the part thereof opposite said conical end of the gland being provided with a conical section having a like but less angular inclination to the axis of said shaft than the conical end of the gland, both said conical surfaces of the gland and that of the shaft forming an acute angle to each other, a packing in said gland, and means for applying pressure for compressing the packing within said gland and against said shaft.

JAMES S. LANG.